(12) United States Patent
Cabilli et al.

(10) Patent No.: US 10,913,596 B2
(45) Date of Patent: *Feb. 9, 2021

(54) CARTRIDGE FOR PREPARING A LIQUID PRODUCT, AND METHOD FOR PRODUCTION THEREOF

(71) Applicant: LUIGI LAVAZZA S.P.A., Turin (IT)

(72) Inventors: Alberto Cabilli, Turin (IT); Danilo Bolognese, Turin (IT); Luisa Borello, Turin (IT)

(73) Assignee: Luigi Lavazza S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/750,846

(22) PCT Filed: Jul. 22, 2016

(86) PCT No.: PCT/IB2016/054385
§ 371 (c)(1),
(2) Date: Feb. 7, 2018

(87) PCT Pub. No.: WO2017/029565
PCT Pub. Date: Feb. 23, 2017

(65) Prior Publication Data
US 2018/0229923 A1    Aug. 16, 2018

(30) Foreign Application Priority Data
Aug. 19, 2015 (IT) ........................ 102015000045300

(51) Int. Cl.
*B65D 85/80* (2006.01)
*B65B 29/02* (2006.01)
(Continued)

(52) U.S. Cl.
CPC ........ *B65D 85/8043* (2013.01); *B65B 29/022* (2017.08); *B65D 65/466* (2013.01); *Y02W 90/10* (2015.05)

(58) Field of Classification Search
CPC ............ B65D 85/8043; B65D 47/0814; B65D 47/08; B65D 41/0442; B65D 41/0435;
(Continued)

(56) References Cited

U.S. PATENT DOCUMENTS 5,089,307 A * 2/1992 Ninomiya .......... A22C 13/0013
428/35.2
5,472,719 A * 12/1995 Favre .................. A47J 31/0673
426/112
(Continued)

FOREIGN PATENT DOCUMENTS

| EP | 2 537 777 | 12/2012 | |
| EP | 2537777 A1 * | 12/2012 | ......... B65D 85/8043 |

(Continued)

OTHER PUBLICATIONS

International Search Report and Written Opinion of the ISA for PCT/IB2016/054385 dated Sep. 30, 2016, 11 pages.

*Primary Examiner* — Ericson M Lachica
(74) *Attorney, Agent, or Firm* — Nixon & Vanderhye P.C.

(57) ABSTRACT

A cartridge (10) containing a dose (12) of at least one substance, for example, ground coffee, for preparing a liquid product using liquid and/or steam introduced into the cartridge (10) comprises a body (14) with a bottom wall (142) and a cover (16) for closing the body (14) of the cartridge (10) in a position opposite to the bottom wall (142). The cover (16) is coupled to the body (14) via a coupling element, such as, for example, the mouth part (144) of the body or a lock ring (148) that undergoes shape variation under the action of said liquid and/or steam, thus causing release of the coupling between the cover (16) and the body (14) of the cartridge (10). The coupling element (144, 148) comprises, for example, compostable material that can undergo post-crystallization under the action of heat, which (Continued)

has not been subjected to post-crystallization in the cartridge (10) prior to use.

8 Claims, 4 Drawing Sheets

(51) Int. Cl.
*B65D 65/46* (2006.01)
*B65D 85/804* (2006.01)

(58) Field of Classification Search
CPC .... B65D 45/322; B65D 45/32; B65D 85/804; B65D 85/8046; B65D 65/466; B65D 55/02; B65D 43/02; B65F 1/1615; B65B 29/022; Y02W 90/10
See application file for complete search history.

(56) References Cited

U.S. PATENT DOCUMENTS

| | | | | |
|---|---|---|---|---|
| 2010/0102023 A1* | 4/2010 | Yarro | ............... | A63H 27/005 215/382 |
| 2012/0058226 A1* | 3/2012 | Winkler | ............... | A47J 31/3695 426/79 |
| 2012/0223077 A1* | 9/2012 | Claypool | ............ | B65D 43/0222 220/315 |
| 2013/0270176 A1* | 10/2013 | Schreiber | ........... | B65D 85/8043 210/477 |
| 2014/0161936 A1* | 6/2014 | Trombetta | ........... | B65D 85/816 426/77 |
| 2014/0335236 A1* | 11/2014 | Footz | ................... | B65D 43/022 426/115 |
| 2014/0342059 A1* | 11/2014 | Trombetta | ......... | B65D 85/8043 426/115 |
| 2015/0048089 A1* | 2/2015 | Robertson | .......... | B29D 99/0096 220/350 |
| 2015/0069063 A1* | 3/2015 | Yang | .................. | B65D 43/0212 220/319 |

FOREIGN PATENT DOCUMENTS

| | | |
|---|---|---|
| WO | WO 2008/148646 | 12/2008 |
| WO | WO 2012/168764 | 12/2012 |
| WO | WO 2013/101302 | 7/2013 |
| WO | WO 2014/188285 | 11/2014 |

* cited by examiner

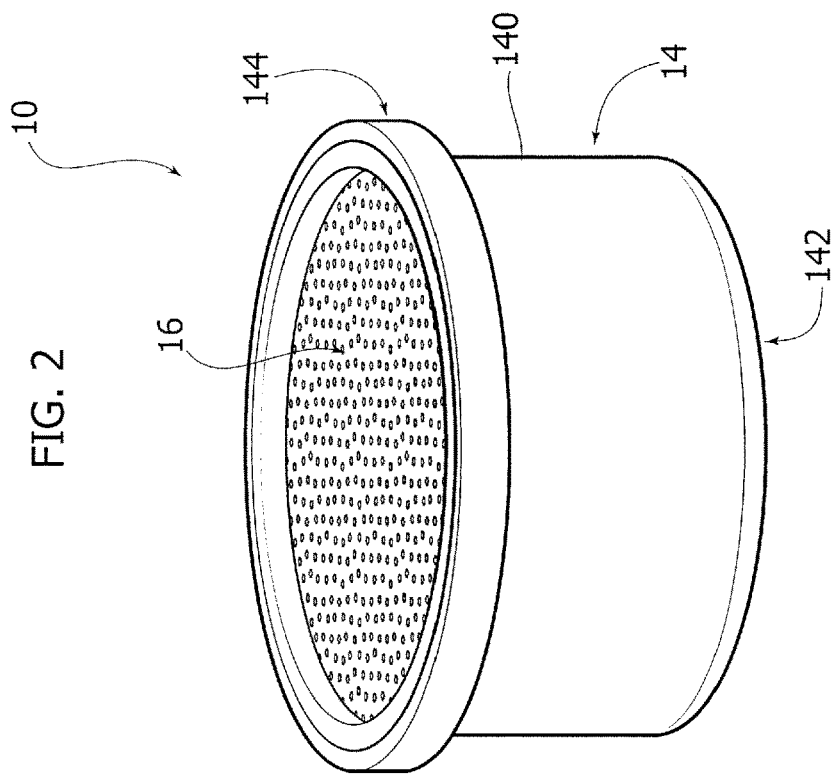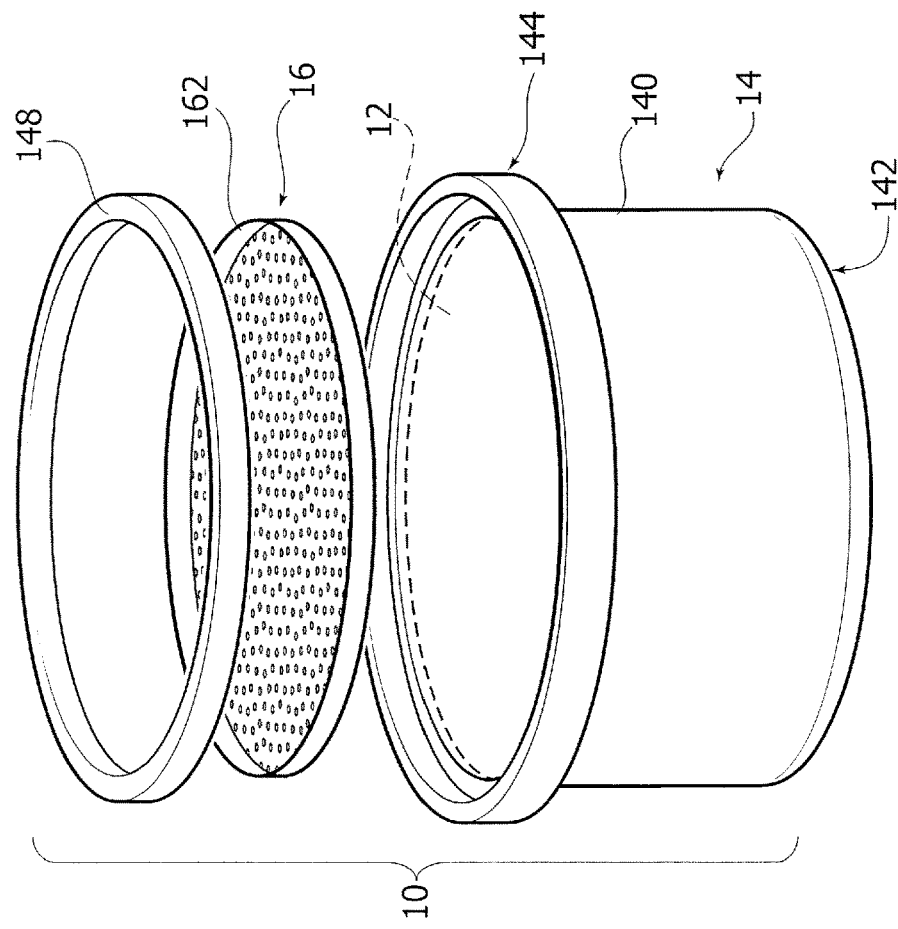

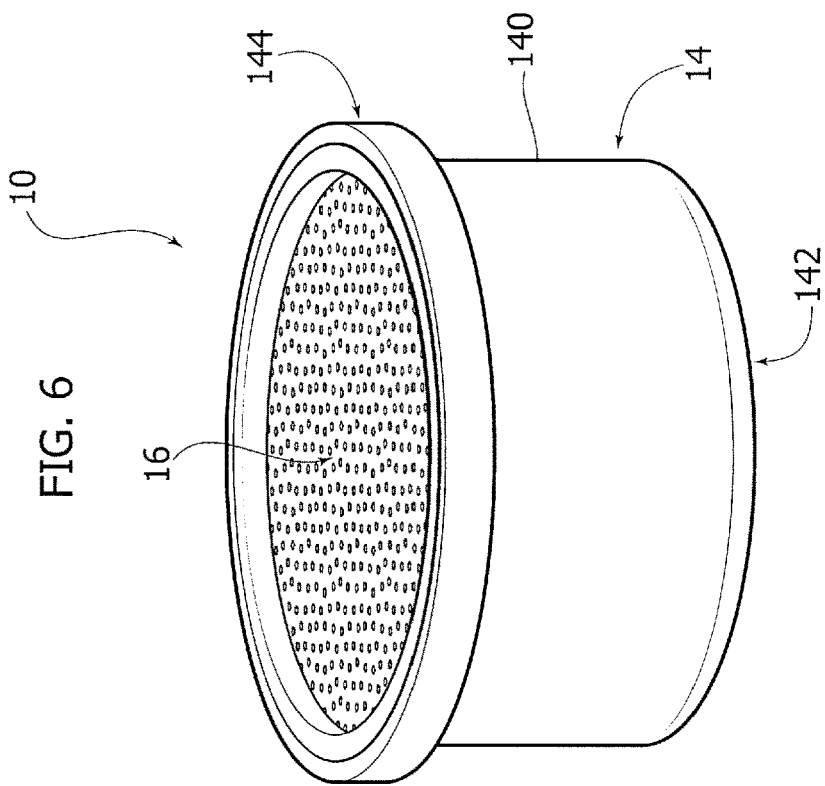
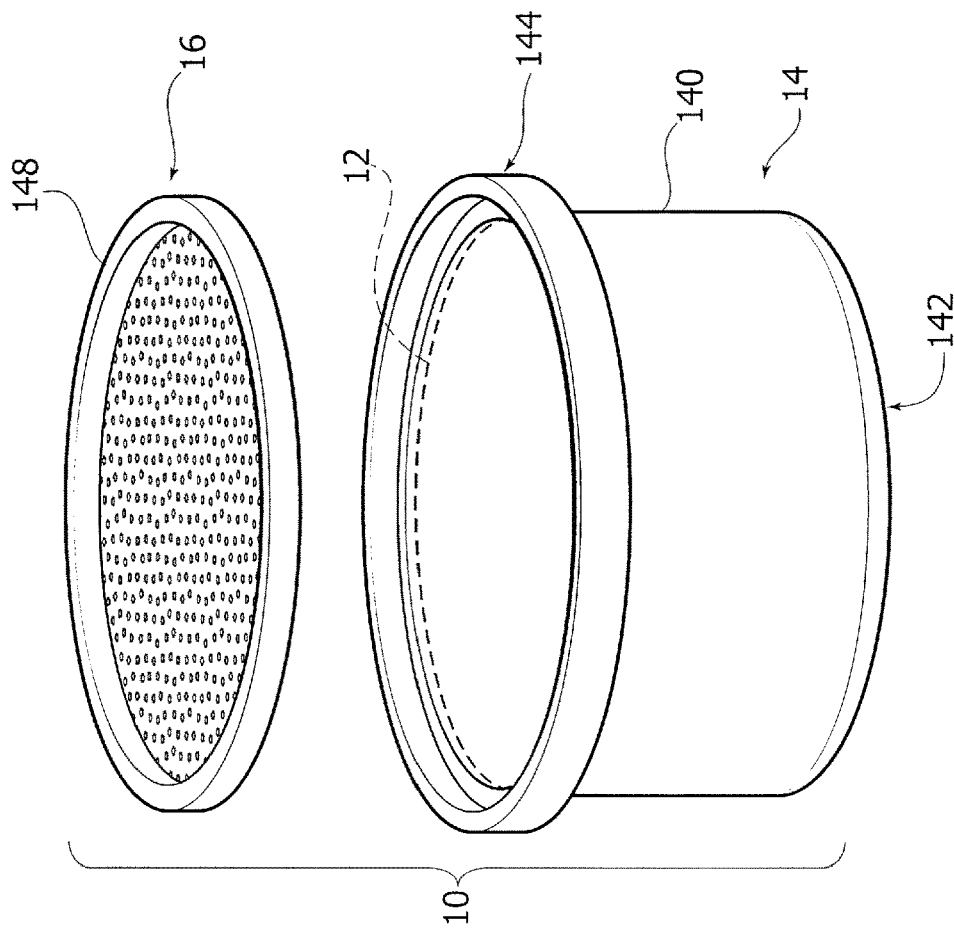

CARTRIDGE FOR PREPARING A LIQUID PRODUCT, AND METHOD FOR PRODUCTION THEREOF

This application is the U.S. national phase of International Application No. PCT/IB2016/054385 filed Jul. 22, 2016 which designated the U.S. and claims priority to IT Patent Application No. 102015000045300 filed Aug. 19, 2015, the entire contents of each of which are hereby incorporated by reference.

TECHNICAL FIELD

The present disclosure relates to cartridges for preparing liquid products.

One or more embodiments may refer to cartridges for preparing beverages, for example coffee.

TECHNOLOGICAL BACKGROUND

Cartridges (or capsules or pods, according to other terms widely used) for preparing liquid product, such as for example a beverage, via introduction into the cartridge of liquid (possibly under pressure and/or at a high temperature) and/or steam constitute a technological sector that is extremely rich and articulated.

This is documented, for example, by the following: FR-A-757 358, FR-A-2 373 999 (which corresponds to U.S. Pat. No. 4,136,202), FR-A-2 556 323, GB-A-938 617, GB-A-2 023 086, CH-A-406 561, U.S. Pat. Nos. 3,403,617, 3,470, 812, 3,607,297 (which corresponds to FR-A-1 537 031), WO-A-86/02 537, EP-A-0 199 953, EP-A-0 211 511, EP-A-0 242 556, EP-A-0 468 078, EP-A-0 469 162, EP-A-0 507 905, WO 2010/106516 A1, and EP-A-2 218 653.

A fair share of the solutions described in the documents referred to above primarily regards preparation of liquid products constituted by beverages such as coffee, tea, chocolate, broth, soups, or various infusions.

With the growing interest for the environment and for the end of life of food waste produced on a daily basis, a certain degree of attention has been paid in recent times to the possibility of facilitating disposal of such cartridges after use, for example, producing them, either totally or in part, with materials that may be defined—using a terminology also adopted at a patent level (see, for example, EP-B-0 497 838, EP-B-0 561 982, EP-B-0 788 733, EP-B-0 723 572, EP-B-0 868 275, EP-B-0 971 818 and EP-B-1 842 944)—as "compostable materials", for example, according to the European Norm EN 13432. Documents such as WO 2010/106516 A1, WO 2012/077066 A1, and WO 2012/080908 A1 describe various solutions of cartridges comprising biodegradable/compostable materials.

Experimentation and use of these cartridges demonstrate that, at least in certain situations:

biodegradable/compostable materials may present, for example, as regards production of the body of the cartridge, characteristics of performance that are less brilliant than those of traditional materials, such as plastic materials (e.g., olefins) or metals (e.g., aluminium);

also, irrespective of the materials used—whether traditional ones or biodegradable/compostable ones—proper disposal of the cartridge after use (the so-called spent cartridge) may find an intrinsic limit in the fact that it preserves the character of a more or less closed body, inside which the dose (e.g., ground coffee) used remains.

OBJECT AND SUMMARY

The object of one or more embodiments is to tackle the above critical aspects.

One or more embodiments enable this object to be achieved thanks to a cartridge having the characteristics recalled in the ensuing claims.

One or more embodiments may also regard a method for providing such a cartridge.

The claims form an integral part of the technical teaching provided herein in relation to the invention. One or more embodiments may afford, among other things, the following advantages:

it is possible to provide an ecologically correct disposal of the cartridge even when, for example, for production of the body of the cartridge, traditional materials are used, such as plastic materials (e.g., olefins) or metals (e.g., aluminium), and/or irrespective of the materials used—whether traditional ones or biodegradable/compostable ones—it is possible to ensure, after use, easy emptying of the cartridge of what remains of the dose used.

In one or more embodiments, parts of a cartridge can be connected together by purely mechanical coupling. In one or more embodiments, to provide the aforesaid purely mechanical coupling it is possible to resort to complementary formations, one of which encloses the other, countering separation of the cover from the body, i.e., fixing the cover on the body of the cartridge.

BRIEF DESCRIPTION OF THE DRAWINGS

One or more embodiments will now be described, purely by way of non-limiting example, with reference to the annexed plates of drawings, wherein:

FIGS. 1 and 2 are perspective views of a cartridge according to embodiments, represented respectively in exploded view and in the assembled condition;

FIGS. 5 and 6 are further perspective views of a cartridge according to embodiments, once again represented in exploded view and in the assembled condition, respectively.

DETAILED DESCRIPTION

Figure 4:
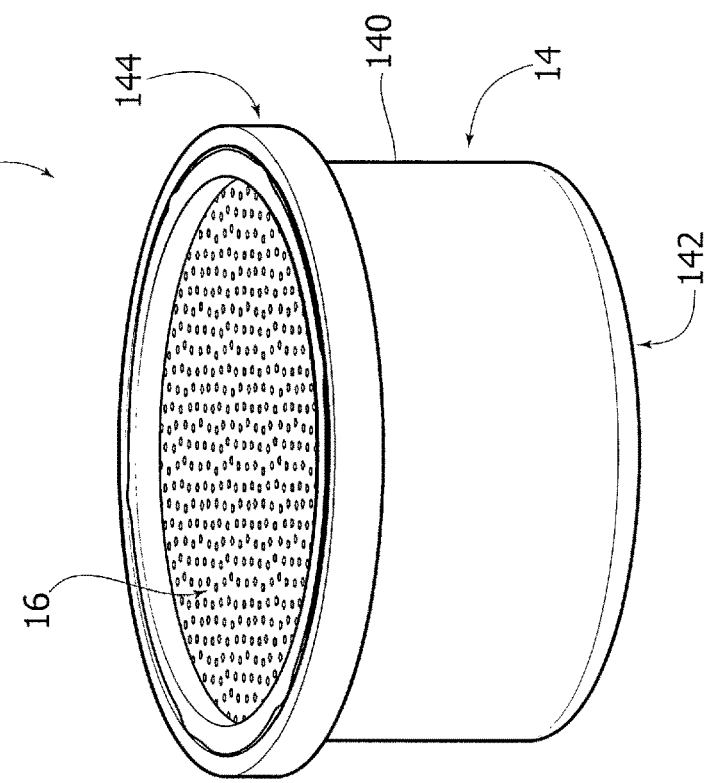
FIGS. 3 and 4 are other perspective views of a cartridge according to embodiments, also here represented in exploded view and in the assembled condition, respectively.

In the ensuing description, various specific details are illustrated aimed at providing an in-depth understanding of various examples of embodiment.

The embodiments may be obtained without one or more of the specific details, or with other methods, components, materials, etc. In other cases, known structures, materials, or operations are not illustrated or described in detail so that various aspects of the embodiments will not be obscured. Reference to "an embodiment" or "one embodiment" in the framework of the present description is intended to indicate that a particular configuration, structure, or feature described in relation to the embodiment is comprised in at least one embodiment. Consequently, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided merely for the convenience of the reader and hence do not define the sphere of protection or the scope of the embodiments.

In the figures, the reference number 10 designates as a whole a cartridge (or pod or capsule, these terms being considered herein as equivalent) for preparing a liquid product via introduction into the cartridge of liquid and/or steam.

In one or more embodiments, the liquid product in question may be constituted by a beverage such as for example coffee (e.g., espresso coffee or filter coffee) obtained by introducing into the cartridge liquid at a high temperature (i.e., hot) and/or steam under pressure.

In any case, the repeated reference, in the framework of the present detailed description, to preparation of the beverage coffee is not to be understood as in any way limiting the scope of the embodiments, which is altogether general.

In one or more embodiments, the cartridge 10 may contain a dose 12 of a substance that is able to form the liquid product via the aforesaid liquid and/or steam. For simplicity of representation, the dose of substance 12 is represented schematically by a dashed line only in FIGS. 1, 3, 5, and 7.

In one or more embodiments, the dose 12 may be constituted by ground coffee or by some other precursor of a liquid product, such as for example a beverage like tea, powdered or granulated chocolate, and products for preparing broths, soups, drinks, and infusions of various nature: this list is to be understood as being provided purely by way of non-imperative example.

In one or more embodiments, in the structure of the cartridge 10, which may be shaped like a tray or small cup in which the dose 12 is located, the following may be distinguished:
  a body 14, comprising a side wall 140 and a bottom wall 142 that closes the body 14 at one end of the wall 140; and
  a sealing cover 16 that closes the cartridge 10 in a position opposite to the bottom wall 142 (e.g., at the opposite end).

In one or more embodiments, as represented in the annexed figures, the body 14 may have an as a whole cylindrical shape and/or the cover is shaped like a circular disk.

In one or more embodiments, the body 14 may present a tray-like conformation that is at least slightly divergent starting from the bottom wall 142 towards the end closed by the cover 16.

In one or more embodiments, the divergent conformation may be a frustoconical conformation. This conformation is not on the other hand imperative: the cartridge 14 may as a whole present different shapes, for example a prismatic shape, a frusto-pyramidal shape, a square shape, etc.

As will emerge more clearly in what follows, in one or more embodiments the cover 16 is suited to being connected (e.g., in a fluid-tight way) to the side wall 140 of the body 14 of the cartridge, for example to the mouth part 144 of the body 14.

In one or more embodiments, the bottom 142 may have a structure with parts in relief and recessed parts.

In one or more embodiments, as exemplified in the figures, the cover 16 may be of a perforated type; i.e., it may be formed right from the start with holes in the cover 16.

In one or more embodiments, the cover 16 may present a mesh-like and/or filter-like structure.

In one or more embodiments, the cover 16 may be made of filter paper.

In one or more embodiments, similar considerations may apply to the bottom 142.

With the cover 16 and/or the bottom 142 of a type that is perforated right from the start, the cartridge 10 may be designed to be inserted in a tearable sachet (e.g., of a flow-pack type) or a similar sealed pack in order to prevent the dose 12 from coming into contact with the environment prior to use, thus preserving the characteristics thereof.

In one or more embodiments, the cover 16 and/or the bottom 142 may be of a closed (not perforated) type and thus be designed to be perforated only at the moment of preparation of the beverage, for example, according to the criteria disclosed in some of the documents cited in the introductory part of the present description (see, for example, EP-A-0 507 905 A1).

It will be appreciated, on the other hand, that reference to the two parts 14 and 16 as "body" and "cover" has a basically explanatory purpose.

In particular, the above terminology is altogether irrespective of the direction with which liquid and/or steam are/is introduced into the cartridge 10 and of the direction in which the resulting product is able to flow out of the cartridge 10.

For instance, one or more embodiments, as illustrated in the annexed figures, may envisage that the liquid and/or steam are introduced into the cartridge 10 through the cover 16, with the product that flows out of the cartridge 10 through the bottom wall 142.

One or more embodiments may, instead, envisage that the liquid and/or steam are introduced into the cartridge 10 through the bottom wall 142 with the product that flows out of the cartridge 10 through the cover 16.

The foregoing is irrespective of whether the cover 16 and/or the bottom wall 142 are perforated right from the start (possibly having a porous structure) or else are perforated only during use (see, for example, EP-A-0 507 905 A1, already cited previously).

One or more embodiments may envisage use, for providing for example the body 14 of the cartridge, of a plastic material (e.g., polyolefin) or a metal (e.g., aluminium), hence a material that is not identifiable as a biodegradable/compostable material.

One or more embodiments may, instead, envisage use—for example for production of the body 14 of the cartridge—of a material identifiable as a biodegradable/compostable material.

In one or more embodiments as exemplified herein, to fix the cover 16 to the body 14 it is possible to resort to a (purely) mechanical connection, i.e., one that does not entail gluing and/or welding (e.g., heat-sealing or ultrasonic welding).

In one or more embodiments as exemplified herein, to provide the aforesaid purely mechanical coupling it is possible to resort to complementary formations, one of which encloses the other, thus countering separation of the cover 16 from the body 14, i.e., fixing the cover 16 on the body 14.

In one or more embodiments, the cover 16 may be made of a laminar material, such as, for example, filter paper (hence a compostable cellulose material) or micro-perforated compostable polymeric film, which possibly presents an intrinsically perforated or openwork structure, such as to enable, for example, introduction of water and/or steam into the cartridge for preparing a beverage, such as coffee, or else outflow of the beverage from the cartridge 10.

In one or more embodiments, the aforesaid cover 16 may present a plane disk-shaped configuration.

Figure 8:
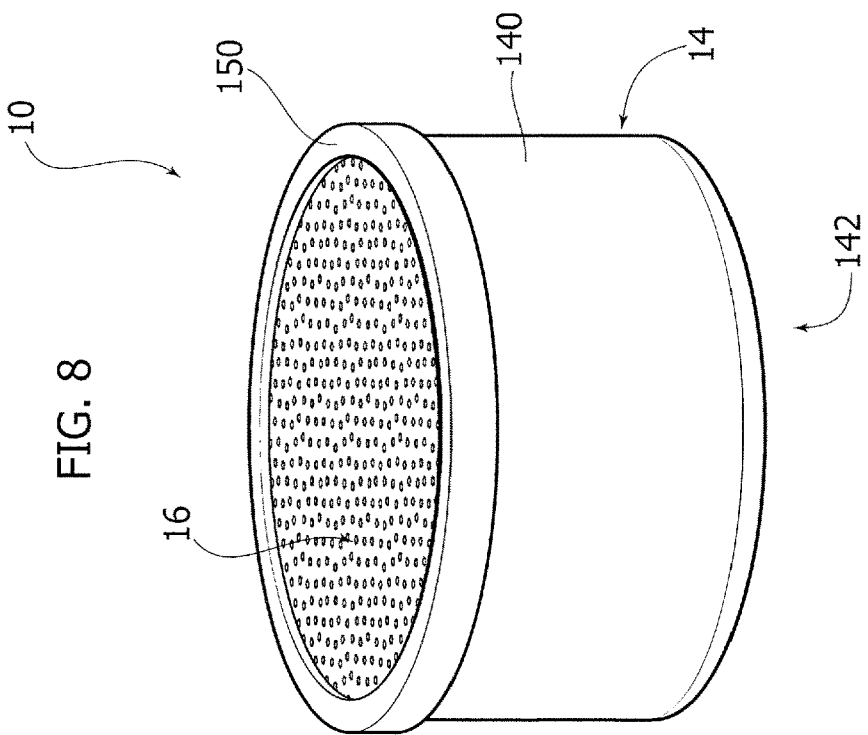
FIGS. 7 and 8 are yet further perspective views of a cartridge according to embodiments, once again represented in exploded view and in the assembled condition, respectively.
Figure 7:
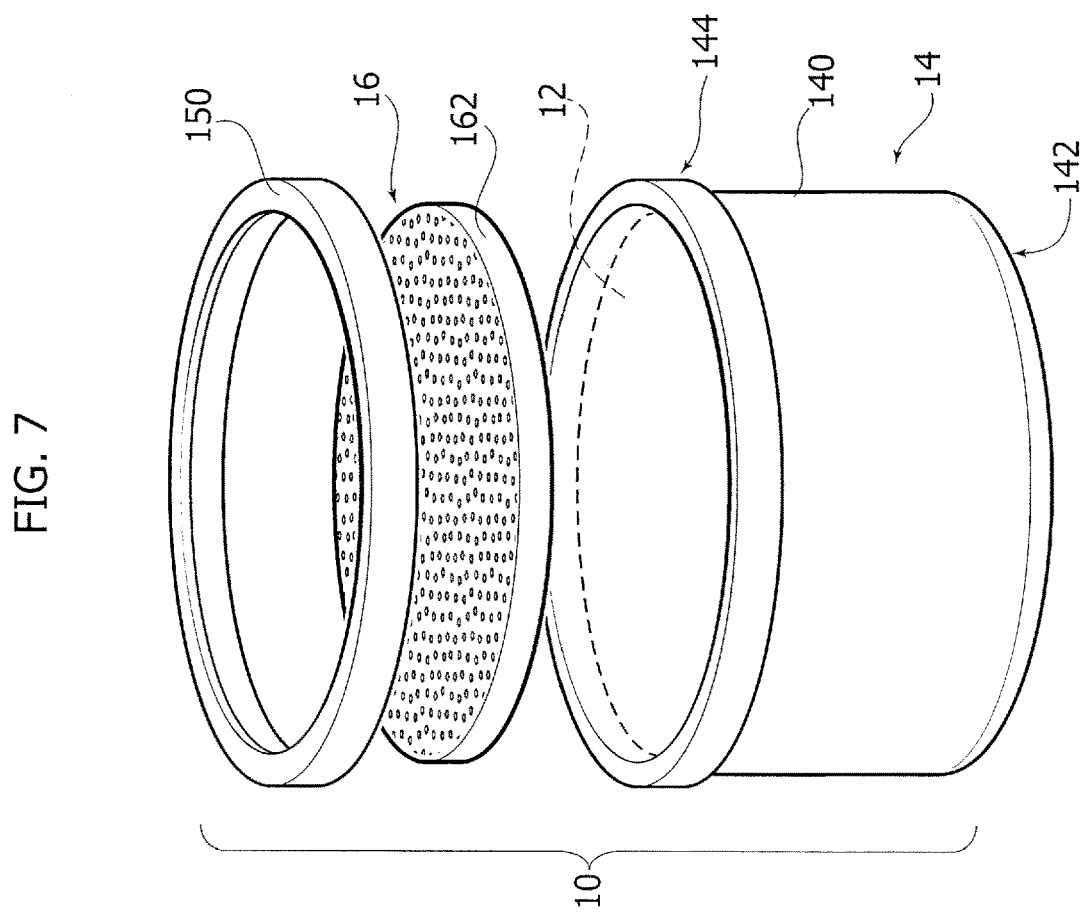

In one or more embodiments as exemplified in FIGS. 1 to 4, as well as in FIGS. 7 and 8, the cover 16 may present a peripheral rim 162. This peripheral rim 162 may be bent, for example, upwards, i.e., towards the outside of the cartridge 10 (FIGS. 1 to 4), or else downwards i.e., towards the inside of the cartridge 10 (FIGS. 7 and 8).

FIGS. 1 to 4, as well as FIGS. 7 and 8, exemplify one or more embodiments in which the peripheral rim 162 of the cover 16 can be fastened in a groove formed at the mouth part 144 of the body 14 of the cartridge 10.

In the embodiments exemplified in FIGS. 1 to 4:—the mouth part 144 of the body 14 has a flange (e.g., an L-shaped flange) projecting towards the outside of the body 14 itself;
  the cover 16 rests peripherally on the proximal branch of the flange, possibly with the peripheral rim 162—if present—bent against the distal branch of the flange; and
  a lock ring 148 is inserted within the L-shaped flange so as to create a groove, in which the edge of the cover 16 is gripped, possibly with the peripheral rim 162—if present—fastened (pinched) between the ring 148 and the flange.

In the embodiments exemplified in FIGS. 7 and 8:
the cover 16 rests peripherally on the mouth part 144 of the body 14, which may possibly present a (slight) thickening like a flange, possibly with the peripheral rim 162—if present—bent against said mouth part 144; and
  a lock ring 150 (e.g., with an L-shaped transverse profile) is fitted on the outside of the mouth part 144 of the body 14 so as to create once again a groove in which the edge of the cover 16 is gripped, possibly with the peripheral rim 162—if present—fastened (pinched) between the ring 150 and the mouth part 144 of the body 14.

In the embodiments exemplified in FIGS. 1 and 2, the ring 148 is smooth on the outside.

Figure 3:
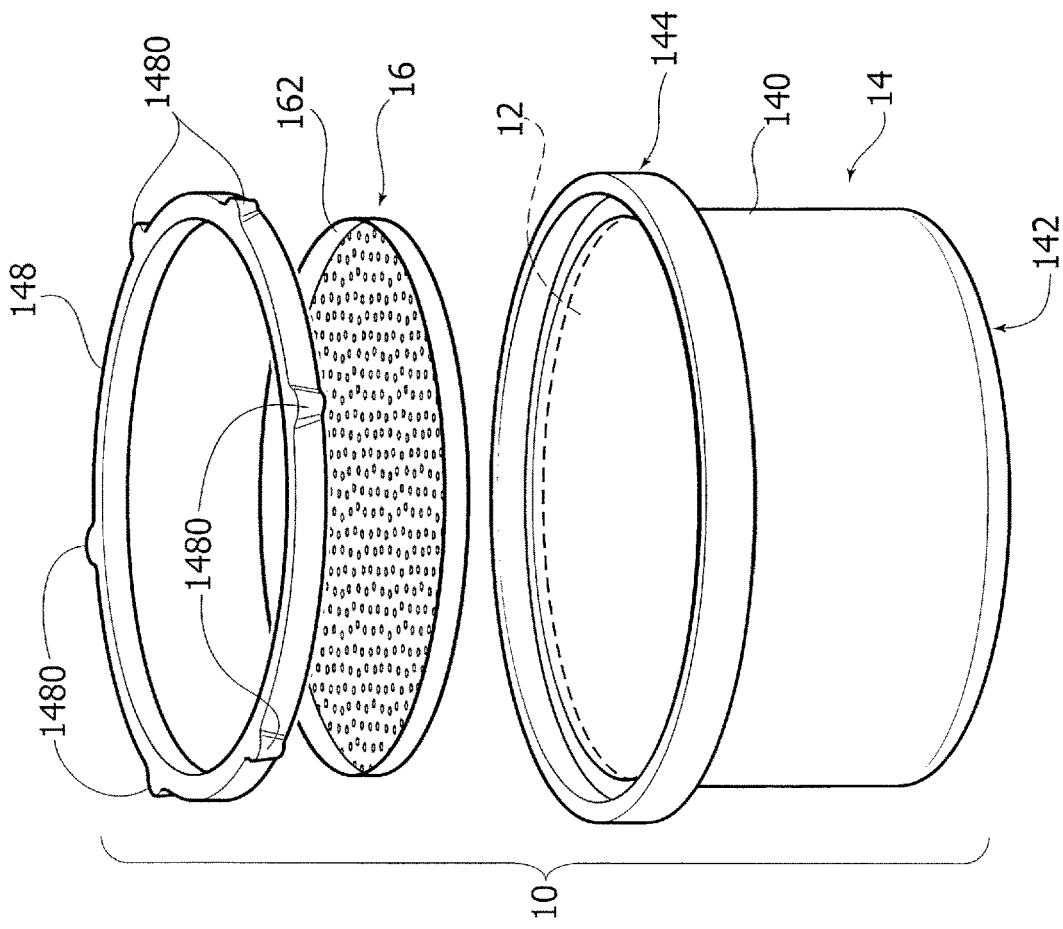

In the embodiments exemplified in FIGS. 3 and 4, the ring 148 is externally provided with projections, such as, for example, teeth 1480 (slightly) projecting outwards, for instance, in positions spaced at angular distances apart, so as to "bite into" the peripheral rim 162 of the cover 16, thus ensuring the condition of anchorage of the cover 16 on the body 14.

It will be appreciated that, in embodiments as exemplified in FIGS. 7 and 8, the ring 150 can be provided on the inside with projections (not visible in the figures), such as, for example, teeth (slightly) projecting inwards, for instance, in positions spaced at angular distances apart, so as to "bite into" the peripheral rim 162 of the cover 16, thus ensuring the condition of anchorage of the cover 16 on the body 14.

FIGS. 1 to 4, as well as FIGS. 7 and 8, hence exemplify one or more embodiments in which the peripheral rim of the cover 16 is fastened in a groove formed at the mouth part 144 of the body 14 of the cartridge 10.

In the embodiments exemplified in FIGS. 5 and 6, the mouth part 144 of the body 14 can once again have a flange (e.g., an L-shaped flange) projecting towards the outside of the body 14 itself, with the cover 16 that rests peripherally on the proximal branch of the flange and the lock ring 148 made of a single piece, with both the cover 16 and the ring 148 moulded using one and the same material, for example, a compostable polymeric material.

Once again, the ring 148 can thus be fitted on the inside of the L-shaped flange so as to retain the cover on the body 14, with which the ring 148 forms a single piece.

It will be appreciated that a structurally similar solution can be adopted also in the embodiments exemplified in FIGS. 7 and 8, envisaging that the lock ring 150 is made of a single piece with the cover 16. Once again, the ring 150 can thus be fitted on the mouth edge 144 of the body 14 so as to retain the cover 16, with which the ring 150 forms a single piece, on the body 14.

It will likewise be appreciated that, in one or more embodiments, the rings 148 and 150 do not necessarily have to be closed rings; they may present in the form of an open ring, even when they are made of a single piece with the cover 16.

It will again be appreciated that the individual details of construction presented herein with reference to one or more of the annexed figures can be applied to embodiments exemplified in the various figures. Just to provide a non-limiting example of other possibilities, there may be envisaged the presence of the projections 1480 illustrated in FIGS. 3 and 4, where the ring 148 is a piece separate from the cover 16, in a ring as shown in FIGS. 5 and 6, where the ring 148 forms a single piece with the cover 16.

Some materials that can be used for producing parts of cartridges 10 as exemplified herein may be of the type for which post-crystallization in an oven is envisaged.

This may be the case, for example, of compostable polymeric materials such as the material with an amylose and amylopectin base marketed under the commercial name of Mater-Bi® by the companies of the Novamont group.

It has been found that this post-crystallization process, which can be carried out after packaging of the cartridge 10 (i.e., after the dose 12 has been inserted into the body 14 and the cartridge 10 has been closed by applying the cover 16 on the body 14 for closing the latter) may be exploited for rendering consequent shrinkage of the material useful for the purpose of relative fixing of the parts of the cartridge 10, for example for ensuring the condition of anchorage of a cover 16 on the body 14, obtained by a ring that surrounds the mouth part 144 of the body 14 as in the case of FIGS. 7 and 8: shrinkage induced in such a ring by post-crystallization in an oven may in fact lead the ring to undergo radial contraction and hence to grip the cover 16 more tightly on the body 14 of the cartridge 10.

One or more embodiments may, instead, envisage an opposite approach.

One or more embodiments may in fact envisage that assembly of the cover 16 on the body 14 of the capsule 10 is obtained by interference (e.g., with a ring 148 fitted into a flange provided on the mouth part 144 of the body 14), likewise envisaging omission of any treatment (such as, for example, post-crystallization in an oven) that is able to induce radial contraction of the ring 148. In this case, the ring 148, as mounted on the cartridge 10, is (heat)shrinkable.

In other words, in one or more embodiments, as exemplified in FIGS. 1 to 6, the cartridge 10 can be filled with the dose 12 and then assembled (i.e., closed) to obtain mechanical interference between the ring 148, the cover 16, and the body 14, without, however, providing a post-crystallization treatment in an oven or any thermal treatment that is able to induce (heat) shrinkage of the material of the ring 148.

In one or more embodiments, mechanical interference (e.g., in the terms described with reference to FIGS. 1 to 6) is able to guarantee that the cartridge will not come apart during packaging, transport, and use.

During preparation of the beverage with hot water or steam, thermal energy is supplied to the ring 148 that holds the cover 16 on the body 14. During preparation of the beverage with hot water or steam, the ring 148 can hence undergo thermal treatment that causes a change of shape thereof, for example, (heat) shrinkage.

This may be the case, for example, of a ring 148 made of a compostable polymeric material of the type exemplified previously, which, during the heat-crystallization process, in addition to becoming more rigid, undergoes geometrical shrinkage such as to lead to a reduction of the diameter of the ring 148.

The phenomenon of shrinkage does not occur, instead, in the body 14 (e.g., in the mouth part 144) in so far as it is made of materials, such as plastic materials (e.g., polyolefins) or metals (e.g., aluminium), or else again of compostable materials such as the material used for the ring 148, when—unlike what is envisaged for the ring 148—the material of the body 14 has previously been subjected to a post-crystallization treatment such as to render it dimensionally stable, i.e., not (heat)shrinkable.

In other words, in one or more embodiments as exemplified in FIGS. 1 to 6, it is possible to exploit the fact that, during preparation of the beverage with hot water or steam, the ring 148 contracts, whereas the mouth part (the flange) 144 retains its diameter, without contracting.

Once used, the cartridge 10 (e.g., as it is extracted or expelled from the machine used for preparing, for example, a beverage such as coffee) can hence present a ring 148 of diameter smaller than what it had previously, thus nullifying the condition of mechanical interference that previously withheld the cover 16 on the body 14.

In these conditions, for example, by holding the body 14 of the cartridge 10 and shaking it, the cartridge can be opened easily (i.e., the cover 16 can be separated from the body 14: see, for example, FIGS. 1, 3 and 5), with the possibility of removing the contents, namely, the dose 12, for example, of coffee, possible filter paper present on the bottom of the body 14, the cover 16, and the ring 142.

All these contents may be made of compostable materials, which can be disposed of according to the procedures envisaged for such materials.

Since the body 14 of the cartridge 10 is at this point empty, it can be disposed of separately in a suitable way, even when it is made, for example, of plastic material (e.g., polyolefin) or metal material (e.g., aluminium). These materials may be used for making the body 14 (the part of the cartridge that undergoes the greatest thermal and mechanical stresses), given that they are cheaper and present higher levels of performance (e.g., as regards the temperatures that can be applied during preparation of the beverage) as compared to compostable materials. In the case of compostability of all the parts of the cartridge 10 (e.g., the body 14 made of compostable material previously subjected to crystallization treatment), opening of the spent cartridge can take place spontaneously during composting, enabling emptying of the cartridge 10 in such a way as to favour the process of disintegration during composting in so far as, for example, bacteria can attack the internal surfaces of the cartridge more easily, without being slowed down by what remains of the dose 12.

A similar mechanism aimed at facilitating opening of the cartridge 10 after use may be implemented with reference to embodiments as exemplified in FIGS. 7 and 8.

In one or more embodiments, it may in fact be envisaged that assembly of the cover 16 on the body 14 of the capsule 10 is obtained once again by interference (e.g., with the ring 150 fitted on the outside of the mouth part 144 of the body 14), envisaging, however, in this case omission of any treatment (such as, for example, post-crystallization in an oven) that might induce radial contraction of the mouth part 144 of the body 14: this result may be obtained, for example, by making the body 14 (or even just the mouth part 144) of the material with an amylose and amylopectin base, as already mentioned previously, and omitting any treatment thereof, such as post-crystallization heat treatment.

In this case, it is likewise envisaged that the ring 150 (and possibly the cover 16, for example if it is made of a single piece with the ring 150) is made, for instance, of the same material but is, however, subjected to the treatment (such as, post-crystallization in an oven) that is able to induce radial contraction, so that, after treatment, the ring 150 is no longer (heat)shrinkable, whereas the mouth part 144 of the body 14 is (heat)shrinkable in so far as it has not been treated.

In one or more embodiments as exemplified in FIGS. 7 and 8, the cartridge 10 may be filled with the dose 12 and then assembled (i.e., closed) by mechanical interference between the ring 150, the cover 16, and the body 14, without, however, carrying out a treatment of post-crystallization in an oven or any heat treatment that is able to induce (heat)shrinkage of the mouth part 144.

Also in this case, mechanical interference (e.g., in the terms described previously with reference to FIGS. 7 and 8) is able to guarantee that the cartridge 10 will not come apart during packaging, transport, and use.

During preparation of the beverage with hot water or steam, thermal energy is supplied to the mouth part 144 on which the ring 150 that withholds the cover 16 on the body 14 is fitted. During preparation of the beverage with hot water or steam, the mouth part 144 can hence undergo (heat)shrinkage.

This may be the case, for example, of a body 14 made of a compostable polymeric material of the type exemplified previously, which, during the process of heat crystallization, in addition to becoming more rigid, undergoes geometrical shrinkage such as to lead to a reduction in the diameter of the mouth part 144. Instead, the ring 150, which has already been treated previously, does not undergo shrinkage and maintains its diameter.

In other words, in one or more embodiments as exemplified in FIGS. 7 and 8, it is possible to exploit the fact that during preparation of the beverage with hot water or steam the mouth part 144 contracts, whereas the ring 150 maintains its diameter without undergoing contraction.

Once used, the cartridge (e.g., as it is extracted or expelled from the machine used for preparing, for example, a beverage such as coffee) has a mouth part 144 having a diameter smaller than what it had previously, thus nullifying the condition of mechanical interference that previously withheld the cover 16 on the body 14 via the ring 150.

Once again, in these conditions opening of the cartridge (i.e., separation of the cover 16 from the body 14: see, as example, FIG. 7) can easily be achieved, with all the parts of the cartridge, i.e., the dose 12, the possible filter paper present on the bottom of the body 14, the cover 16, the ring 142, and the body 14, which may all be made of compostable materials.

As already mentioned previously, in the case of compostability of all the parts of the cartridge 10, opening of the spent cartridge can take place spontaneously during composting, enabling emptying of the cartridge 10 in such a way as to favour the process of disintegration during composting in so far as, for example, bacteria can attack the internal surfaces of the cartridge more easily, without being slowed down by what remains of the dose 12.

It will be appreciated that such an advantage may be obtained both with an internal ring (148, in FIGS. 1 to 6) and with an external ring (150, in FIGS. 7 and 8).

In more general terms, in one or more embodiments as exemplified herein, the cover 16 can be coupled to the body 14 via a coupling element (the ring 148, in the embodiments of FIGS. 1 to 6; the mouth part 144, in the embodiments of FIGS. 7 and 8) that is able to undergo shape variation (contraction, as in the examples considered herein) under the action of liquid and/or steam during preparation of the product (e.g., a beverage such as coffee), this shape variation causing release of the coupling between the cover 16 and the body 14 so that the cartridge 10, once spent, can be opened, favouring exit of its contents.

In one or more embodiments, to fix the cover 16 to the body 14 it is possible to resort to a (purely) mechanical connection, i.e., such as not to entail gluing and/or welding (e.g., heat-sealing or ultrasonic welding).

In one or more embodiments as exemplified herein, to obtain the aforesaid purely mechanical coupling it is possible to resort to complementary formations, one of which (the flange of the mouth part 144 in the embodiments exemplified in FIGS. 1 to 6; the ring 150 in the embodiment exemplified in FIGS. 7 and 8) encloses the other (the ring 148 in the embodiments exemplified in FIGS. 1 to 6; the mouth part 144 in the embodiment exemplified in FIGS. 7 and 8), countering separation of the cover 16 from the body 14, i.e., fixing the cover 16 on the body 14.

The fact that at least one of the complementary formations, functioning as coupling element between the cover 16 and the body 14, undergoes shape variation (e.g., shrinkage) under the action of the liquid and/or steam introduced into the cartridge during use leads to release of the coupling between the cover 16 and the body 14, thus enabling opening of the cartridge 10. Once again it will be appreciated that one or more embodiments are not to be considered as in any way limited to the use of coupling elements comprising material that can be post-crystallized under the action of heat, in particular of the material with an amylose and amylopectin base referred to previously by way of example.

Other materials that can be used in one or more embodiments may comprise, for example:
  polybutylene succinate (PBS)
  polyhydroxyalkanoate (PHA)
  poly-beta-hydroxy butyrate (PHB)
  polycaprolactone (PCL)
  and other compostable polymers and copolymers and/or compounds thereof.

Of course, without prejudice to the underlying principles, the details of construction and the embodiments may vary, even significantly, with respect to what has been illustrated herein purely by way of non-limiting example, without thereby departing from the sphere of protection, which is defined by the annexed claims.

The invention claimed is:

1. A cartridge with a filling of at least one substance for preparing a liquid product by means of liquid and/or steam introduced into the cartridge, the cartridge including:
  a casing with a bottom wall, and
  a cover closing the casing of the cartridge opposite said bottom wall,
  wherein said cover is coupled to said casing by means of a coupling member subject to heat-shrinking under an action of thermal energy supplied by said liquid and/or steam thereby removing coupling of said cover and said casing, wherein:
  the casing includes a sidewall and a mouth portion having a flange with a horizontal portion that extends horizontally outward from the sidewall and the flange has a vertical portion that extends vertically upward from an outer edge of the horizontal portion,
  the cover has a peripheral edge that rests on the horizontal portion of the flange and that contacts the vertical portion of the flange,
  a locking ring is coupled with the mouth portion of the casing for peripherally retaining the cover on said mouth portion of the casing, and
  wherein said locking ring is inserted within the vertical portion of the flange and above the horizontal portion of the flange so as to create a space in which the peripheral edge of the cover is gripped and fastened between the locking ring and the flange without any glue or welding,
  wherein said coupling member subject to said heat-shrinking includes said locking ring.

2. The cartridge of claim 1, wherein said locking ring includes sculpturing cooperating with said mouth portion of the casing.

3. The cartridge of claim 1, wherein said coupling member includes material post-crystallizable under the action of heat, wherein, in the cartridge before use, said coupling member is exempt from post-crystallization.

4. The cartridge of claim 1, wherein said casing includes plastic material or metal.

5. The cartridge of claim 1, wherein said casing, said cover and said coupling member include compostable material.

6. The cartridge of claim 2, wherein said locking ring includes sculpturing, in the form of teeth, cooperating with said mouth portion of the casing.

7. The cartridge of claim 1, wherein said casing includes a polyolefin.

8. The cartridge of claim 1, wherein said casing includes aluminum.

* * * * *